No. 730,148. Patented June 2, 1903.

UNITED STATES PATENT OFFICE.

PAUL ERWIN OBERREIT, OF LUDWIGSHAFEN-ON-THE-RHINE, GERMANY, ASSIGNOR TO BADISCHE ANILIN AND SODA FABRIK, OF LUDWIGSHAFEN-ON-THE-RHINE, GERMANY, A CORPORATION OF BADEN, GERMANY.

INDIGO COLORING-MATTER CONTAINING HALOGEN AND PROCESS OF MAKING SAME.

SPECIFICATION forming part of Letters Patent No. 730,148, dated June 2, 1903.

Application filed February 11, 1902. Serial No. 93,538. (Specimens.)

*To all whom it may concern:*

Be it known that I, PAUL ERWIN OBERREIT, doctor of philosophy and chemist, a subject of the King of Saxony, residing at Ludwigshafen-on-the-Rhine, in the Kingdom of Bavaria, Germany, have invented new and useful Improvements in Indigo Coloring-Matters Containing Halogen, of which the following is a specification.

This invention relates to new indigo coloring-matters containing bromin, and process of producing the same. These products will hereinafter be referred to by the generic term "brominated indigo."

The process employed in this invention consists, essentially, in converting brominated phenyl-glycocoll-ortho-carboxylic acid into, for instance, acetylated brom indoxyl derivatives and finally converting these products into the corresponding brominated indigo coloring-matters. This can be carried into practical effect by treating a brom phenyl-glycocoll-ortho-carboxylic acid (preferably in the form of its sodium salt) with, say, acetic anhydrid, acting on this result (preferably in the dry and purified state) with, say, caustic-soda solution, and then blowing air through the so-obtained liquid. The brominated phenyl-glycocoll-ortho-carboxylic acid employed can be obtained by direct bromination of phenyl-glycocoll-ortho-carboxylic acid itself or by brominating the nitrile of that acid—namely, cyan-methyl-anthranilic acid, which is described in United States Letters Patent No. 662,754, dated November 27, 1900—and subsequently converting the so-obtained product into brominated phenyl-glycocoll-ortho-carboxylic acid by suitable saponification.

In the following examples the nature of this invention is further illustrated, but this invention is not limited to the proportions and conditions therein given. The parts are by weight and the temperature degrees refer to the centigrade scale.

I. *Production of Brominated Phenyl-Glycocoll-Ortho-Carboxylic Acid.*

A. *From phenyl-glycocoll-ortho-carboxylic acid.*—Suspend one hundred and ninety-five (195) parts of phenyl-glycocoll-ortho-carboxylic acid in six hundred (600) parts of glacial acetic acid. Add gradually and stirring the meanwhile one hundred and sixty (160) parts of bromin. Let stand for several hours. Pour the result into three thousand (3,000) parts of water. Filter and wash with water until the filtrate no longer contains halhydric acid, as shown by testing with silver nitrate. The mono-brom-phenyl-glycocoll-ortho-carboxylic acid so obtained, when purified by recrystallization from ethyl alcohol, can be obtained in the form of yellow needles, melting at about two hundred and twenty-eight (228) degrees.

In place of the glacial acetic acid of this example benzene or ligroin may be employed.

B. *From cyan-methyl-anthranilic acid.*—Suspend one hundred and seventy-six (176) parts of cyan-methyl-anthranilic acid in six hundred (600) parts of glacial acetic acid and add one hundred and sixty (160) parts of bromin, cooling the meanwhile. At first solution ensues and then the mono-brom-cyan-methyl-anthranilic acid begins to separate out. When no further separation takes place, filter off the solid material and wash with water. The acid when purified by crystallization from ethyl alcohol occurs in yellow needles, melting at about two hundred and nine (209) degrees. (See *Journal für Praktische Chemie*, N. F. Vol. 63, page 403.) To convert the so-obtained brom cyan-methyl-anthranilic acid into the corresponding brom-phenyl-glycocoll-ortho-carboxylic acid, boil it with an excess of caustic-alkali solution—say caustic-soda solution containing about fifteen (15) per cent. of caustic soda, (NaOH)—until ammonia is no longer given off, then cool and precipitate the brom-phenyl-glycocoll-ortho-carboxylic acid by means of, say, sulfuric acid. The brominated phenyl-glycocoll-ortho-carboxylic acids so obtained can be converted into their, say, sodium salt by suitable treatment with sodium-carbonate solution and subsequently evaporation to dryness on, say, a boiling-water bath.

II. *Production of Brominated Indigo.*

Boil one (1) part of the dry and finely-powdered sodium salt of mono-brom-phenyl-glycocoll-ortho-carboxylic acid with from three (3) to four (4) parts of acetic anhydrid until evolution of gas ceases, then distil off the excess of acetic anhydrid *in vacuo*. The dry residue may be directly operated upon, but it is preferable to extract the same with water and to recrystallize this residue from alcohol and finally from ligroin. Now saponify this product (which is to be regarded as diacetyl-brom-indoxyl) by means of an excess of caustic-soda solution, blow air through the resulting liquid, and collect the dibrom-indigo so resulting in any suitable manner. This product resembles ordinary indigo in its external appearance, but is distinguished from ordinary indigo by its containing bromin and by producing a clearer and more reddish shade when dyed on cotton from a vat such as is adapted for dyeing with ordinary indigo. This coloring-matter does not impart a blue color to cold glacial acetic acid, cold carbon bisulfid, cold chloroform, or hot ethyl alcohol.

What is claimed is—

1. Process for the production of brominated indigo which consists in acting upon cyan-methyl-anthranilic acid successively with brom, caustic alkali, acetic anhydrid, caustic alkali and air.

2. Process for the production of brominated indigo which consists in acting upon brominated cyan-methyl-anthranilic acid successively with caustic alkali, acetic anhydrid, caustic alkali and air.

3. Process for the production of brominated indigo which consists in acting upon brominated phenyl-glycocoll-ortho-carboxylic acid successively with acetic anhydrid, caustic alkali and air.

4. Process for the production of brominated indigo which consists in acting upon acetylated brominated indoxyl with caustic alkali and air.

5. Process for the production of dibrom-indigo which consists in acting on acetylated mono-brom-indoxyl with caustic alkali and air.

6. As a new article of manufacture indigo coloring-matter which can be made from acetylated mono-brom-indoxyl, caustic-soda solution and air; which contains bromin; which does not impart a blue color to cold glacial acetic acid, cold carbon bisulfid, cold chloroform, or hot ethyl alcohol.

In testimony whereof I have hereunto set my hand in the presence of two subscribing witnesses.

PAUL ERWIN OBERREIT.

Witnesses:
ERNEST F. EHRHARDT,
JACOB ADRIAN.